(12) United States Patent
Naifeh et al.

(10) Patent No.: US 8,560,481 B2
(45) Date of Patent: Oct. 15, 2013

(54) METHOD AND APPARATUS FOR ANALYZING SYSTEM EVENTS

(76) Inventors: Gregory P. Naifeh, Dallas, TX (US);
Jerome G. Naifeh, Dallas, TX (US);
Timothy J. Shelton, Midlothian, TX (US)

(*) Notice: Subject to any disclaimer, the term of this patent is extended or adjusted under 35 U.S.C. 154(b) by 203 days.

(21) Appl. No.: 12/947,626

(22) Filed: Nov. 16, 2010

(65) Prior Publication Data

US 2011/0119219 A1   May 19, 2011

Related U.S. Application Data (60) Provisional application No. 61/261,959, filed on Nov. 17, 2009.

(51) Int. Cl.
*G06F 17/00* (2006.01)
*G06N 5/02* (2006.01)

(52) U.S. Cl.
USPC .............................................. 706/47

(58) Field of Classification Search
None
See application file for complete search history.

(56) References Cited

U.S. PATENT DOCUMENTS

| | | | |
|---|---|---|---|
| 6,647,400 B1 | 11/2003 | Moran | |
| 7,162,741 B2 | 1/2007 | Eskin et al. | |
| 7,415,391 B2 | 8/2008 | Chen et al. | |
| 7,920,759 B2 * | 4/2011 | Hull et al. | 382/305 |
| 7,991,778 B2 * | 8/2011 | Hull et al. | 707/741 |
| 8,005,831 B2 * | 8/2011 | Hull et al. | 707/731 |
| 8,117,308 B1 | 2/2012 | Patel | |
| 8,156,427 B2 * | 4/2012 | Graham et al. | 715/254 |
| 8,195,659 B2 * | 6/2012 | Hull et al. | 707/736 |
| 8,224,762 B2 * | 7/2012 | Kawamura et al. | 706/47 |
| 8,332,401 B2 * | 12/2012 | Hull et al. | 707/736 |
| 8,335,789 B2 * | 12/2012 | Hull et al. | 707/736 |
| 2005/0075992 A1 | 4/2005 | Gavan et al. | |
| 2007/0169194 A1 | 7/2007 | Church et al. | |
| 2007/0245357 A1 * | 10/2007 | Breiter et al. | 719/320 |
| 2008/0201778 A1 | 8/2008 | Guo et al. | |
| 2008/0271143 A1 | 10/2008 | Stephens et al. | |
| 2009/0099862 A1 * | 4/2009 | Fireman et al. | 705/2 |
| 2010/0050262 A1 | 2/2010 | Knapp et al. | |
| 2010/0153316 A1 | 6/2010 | Duffield et al. | |
| 2011/0314148 A1 | 12/2011 | Petersen et al. | |
| 2012/0196668 A1 * | 8/2012 | MacNish | 463/17 |

* cited by examiner

*Primary Examiner* — Michael B Holmes
(74) *Attorney, Agent, or Firm* — The Law Office of Patrick B. Law (57) ABSTRACT

An apparatus and an associated method facilitate analysis of events associated with a network system. Event occurrence items are compared with event rules of an event rule set to determine whether the items are potentially significant. If considered to be potentially significant, a scorer assigns a score to the event occurrence item to provide a relative indication of the potential significance of the event occurrence item.

20 Claims, 4 Drawing Sheets

METHOD AND APPARATUS FOR ANALYZING SYSTEM EVENTS

CROSS REFERENCE TO RELATED APPLICATIONS

The present invention claims priority to provisional patent application No. 61/261,959 filed on Nov. 17, 2009, the contents of which are incorporated by their entirety herein.

The present invention relates generally to a manner by which to analyze events occurring at a system, such as a computer network system. More particularly, the present invention relates to an apparatus, and an associated method, by which to identify logged, event occurrences that are significant and to score the identified event occurrences with quantitative scores.

The identification is performed quickly by matching the logged event occurrences with event rules. Scoring provides for prioritizing of the identified event occurrences, to facilitate quick review and analysis of the event occurrences in order of significance. Event occurrences, such as security threats to a computer network system, are more quickly alerted, permitting responsive actions to be taken more quickly.

BACKGROUND

Modern business, manufacturing, computer, and other systems are often times complex. Such systems typically are formed of a set of interacting or interdependent system components that together form and define the system. During system operation, many varied system events occur, both events internal to the system as well as external events that potentially affect the system.

A manager or operator of the system, in order fully to be aware of the system operation should be aware of system-related events, particularly events that might deleteriously affect operation of the system.

In a complex system, a large number of events might occur daily. Logging of the occurrences of such events, when detected, permits subsequent review of the events by the system manager or operator. And, responsive to the subsequent review, the system manager or operator is able to take responsive action.

Because of the potentially large number of event occurrences, the log of the event occurrences is potentially very lengthy. And, review of the logged event occurrences might well be time-consuming.

Most simply, the system manager or operator review event occurrence log sequentially. That is to say, the review of the log comprises a review of every logged entry of an event occurrence. Such a review, in which the review iterates through each of the logged event occurrences, is time-consuming. And, if a small number of significant event occurrences are interspersed amongst a large number of insignificant event occurrences, a reviewer might not properly notice the significant event-occurrence entry in the log.

While various mechanisms are available by which to provide for alerts to be generated to highlight selected event-occurrence entries, the general, iterative review and analysis is still carried out in conventional, sequential and iterative manner.

An improved manner by which to provide for review and analysis of system-event occurrences would be beneficial.

It is in light of this background information related to system operation and management that the significant improvements of the present invention have evolved.

SUMMARY OF THE INVENTION

The present invention, accordingly, advantageously provides apparatus, and an associated method, for analyzing events occurring at a system, such as a computer network system.

Through operation of an embodiment of the present invention, a manner is provided by which to identify logged event occurrences that are significant and to score the identified event occurrences with a quantifiable score.

In one aspect of the present invention, the identification is performed quickly by matching the logged event occurrences with event rules. Logged event occurrences that do not form a match with the event rules are not needed for further review or analysis. Logged event occurrences that match the event rules are caused to remain available for further review and analysis.

In another aspect of the present invention, event occurrences that are identified to match the event rules are scored. Scoring provides for prioritizing of the identified event occurrences, thereby to facilitate quick review and analysis of event occurrence in order of significance. Event occurrences, e.g., occurrences that constitute security threat to a computer network system, are more quickly identified, permitting responsive action to be taken.

In another aspect of the present disclosure, the event occurrences comprise both internally-generated events and externally-generated events. Logically-created associations between similar event occurrences are created. The similarities are drawn by utilizing data-mining and analysis in order to correlate information for secured storage and future retrieval. The correlated data is logged into a relational database and prepared for advanced data management.

In another aspect of the present invention, a multi-layer decision tree is utilized to match the logged event occurrences, i.e., event occurrence items, with event rules. The layers include an initial trigger layer. The trigger layer includes triggers that are matched with the logged event. If the event occurrence matches the trigger, then rule groups associated with the trigger are matched with the event occurrence item. And, once rule group is matched, then the event rules are processed with the logged event occurrence items. That is to say, the layers include a trigger layer, a rule-group player, and the event rules of the associated rule group. In another aspect of the present invention, a container of similar triggers, rule groups, and rules comprises a module. The module also contains, if desired, additional information, such as a module name, description, devices supported by the module, versioning information, and documentation information.

In another aspect of the present invention, the rule groups are nested to facilitate grouping of similar event rules together. In order for event rules to be processed within a rule group, a match must first be made with the rule group associated with the event rules. And, if the rule groups are nested, a match of each is required.

In another aspect of the present invention, a normalizer normalizes the data of the event occurrences that match the event rules that are matched against the event occurrences. The normalizer performs various operations, such as event correlation, data extraction, and hash normalization of the matched even occurrence entries. The data of an even occurrence that has been normalize is generally reduced in data length relative to the size of the corresponding data comprising the even occurrence entry.

In another aspect of the present invention, a scorer is provided to calculate a quantitative score of the normalized, event occurrence entry. The score assigned to the normalized entry identifies the significance of the entry. For instance, a higher score assigned to an entry indicates a potentially higher significance of the entry. And, by being of greater significance, the review and analysis of the event is undertaken more quickly than that of event entries that are of lower scores.

In another aspect of the present invention, the scoring is based upon a rule set. The rule set is, e.g., user-defined. And, the rule-sets are updatable, changeable by a user, or another, when appropriate. The scoring rule set is matched with the normalized entry, and a determination is made as to whether the scoring rules of the scoring-rule set match with the normalized entry. If so, an indication of the successful match is made. And, a cumulated score is formed of a sum of the matches between the scoring rules of the scoring-rule-set, normalized entry. The scoring-rule set includes any of various selected rules including, for instance, a Bayesian value or score, available to sum together with other results to form the cumulated score. And, in one implementation, the selected results are weighted, thereby to weight the associated scoring rule to increase, or decrease, its relative impact in the cumulated score.

In another aspect of the present invention, a prioritizer is provided with the scores computed by the scorer and associated with each of the normalized event occurrence items. The prioritizer prioritizes the event occurrences according to the score as associated with the event occurrences. And a prioritized listing is provided. The listing, when made available to the manager or operator of the network, is able more quickly to analyze the events that are considered to be significant, in order of the perceived significance. And, responsive to the analysis, further action is able to be taken more quickly responsive to the event occurrences.

In these and other aspects, therefore, an apparatus, and an associated method, is provided for facilitating analysis of system events. A collected-event matcher is configured to identify selected system-event items that match at least an event rule of an event-rule set. A scorer is configured to score each system-event information item identified by the collected-event matcher using at least a scoring rule of a scoring-rule set. The score of each scored system-event information item is used to prioritize the scored system-event information items.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
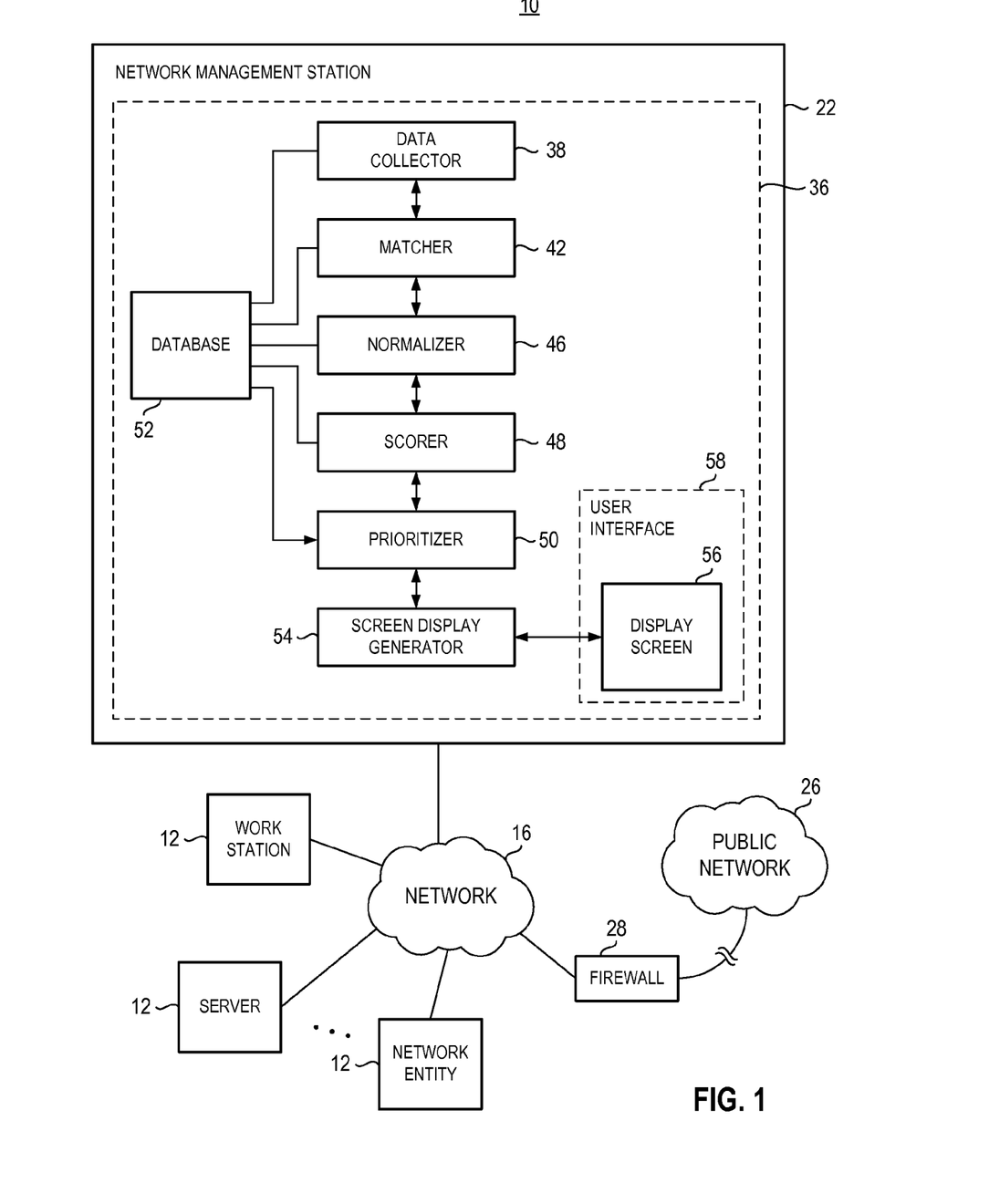
FIG. 1 illustrates a functional block diagram of an exemplary network system that includes an embodiment of the present invention.

Referring first to FIG. 1, an exemplary network, shown generally at 10, includes a plurality of entities 12 placed in communication connectivity, here by way of a network 16 to a network management station 22. The network management station is here also placed in communication connectivity with the other entities 12 by way of the network 16. Information messages generated by the entities 12, or responsive to inquiry generated at the network management station, are provided to the management station by way of the network 16.

The network 16 is here representative of a private network placeable in connectivity with a public network 26 by way of a firewall 28. Messages generated external to the private network and delivered to the firewall 28 by way of the public network 26 are also routable by way of the network 16 to the network management station 22.

The network system 10 is representative of any various networks, such as a business network, a manufacturing network, a medical network system, etc. While the following description shall describe exemplary operation with respect to an exemplary implementation in which the network system comprises a computer network system in which the network entities comprise computer servers, work stations, and the like, the network system is more generally representative of any of various network systems with the network entities being any various entities. Additionally, the exemplary configuration shown in FIG. 1 is by way of example only. In other implementations, the network system is configured in other manners.

The network management station includes the apparatus 36 of an embodiment of the present invention. The apparatus facilitates analysis of operation of the network system by collecting information related to the occurrence of events at the network system in a manner that provides a manager or operator of the network system with indications of events that are considered to be significant, thereby to permit the manager or operator more quickly to take responsive action. The apparatus 16 is functionally represented, implementable in any desired manner including, for instance, by hardware elements, firmware elements, algorithms executable by processing circuitry, and combinations thereof. Additionally, while the elements of the apparatus 36 are, in the illustrated implementation, formed at a single physical entity, in other implementations, the elements are distributed amongst more than one physical entity.

The apparatus 36 includes a data collector 38, a matcher 42, a normalizer 46, a scorer 48, a database 52, and a screen display generator 54. The screen display generator generates a display screen for display at a display element 56 of a user interface 58.

The data collector operates as an event collection engine, utilizing, e.g., an SYSLOG or SNMP, or other analogous, collection algorithm. Data collected by the data collector pertains to events occurring within, or related to, the network system. The collected information, comprising raw data, is stored, here at the database 52, available for subsequent retrieval. In one implementation, the data collector comprises a component capable of loading dynamic plug-ins that support a myriad of vendors in order consistently to pulse more unique data on remote vendor systems.

The collected data is accessed by the matcher 42. The matcher operates to match the collected data, forming event occurrence items, and event rules. The event rules are, e.g., user-defined rules or are otherwise defined. The matcher matches selected ones of the event rules with the event occurrence items that have been collected by the data collector. If the event occurrence item corresponds with an event rule, then the event occurrence item is considered to be a potentially significant event occurrence. Matching operations are performed upon all, or a selected portion, of the event occurrence item collected by the data collector. And, event occurrence items that match the event rules that are compared together with the event occurrence items are normalized by normalizer 46. The normalizer 46 operates to extract, or otherwise identify the significant portions of the matched, event item occurrences. The normalizer also is capable of accessing the database 52 to be provided with the event occurrence items matched by the matcher. And, normalized, event occurrence items are also cached, or stored, at the database 52.

The scorer 48 also is capable of accessing the database 52. The scorer operates to score, that is, provide a quantitative value, to the normalized, matched event occurrence items. Scoring is performed by comparing the normalized, event occurrence item with score event rules. If the event occurrence item corresponds with the score event rule, then a match is made, and a score associated event occurrence item is incremented. In the exemplary implementation, each normalized, event occurrence item is scored against multiple score event rules. If a normalized event occurrence item matches multiple score event rules, then the score of the event occurrence item is of a greater value than an event occurrence item that matches fewer, or no, score event rules. The score associates a score with the event occurrence item, and the score associated with the event occurrence item is stored at the database, indexed together with the associated event occurrence item.

The prioritizer 50 accesses the database to obtain, or is directly provided with, the scores associated with the event occurrence items. The prioritizer prioritizes the event item occurrences based upon the score assigned to the individual ones of the event occurrence items. The prioritizer prioritizes the event occurrence items, e.g., in numerical order, from highest score to lowest score, to prioritize the event occurrence items from potentially most significant, based upon the score, to least significant, based upon the score. The prioritized item entries are used, e.g., to form a list of event occurrence items. Priority indications are also associated with the event occurrence items, stored at the database or immediately provided to the screen display generator 54. If all of the event occurrence items are considered to be an initial set, then the event occurrence items that the matcher indicates to match with the event rules form a subset of the initial set. The scorer scores only the event occurrence items of the subset. And, the prioritizer 50 prioritizes the items of the subset.

The screen display generator generates a screen display to provide, in human perceptible form, a prioritized listing, as well as more detailed displays, relating to the prioritized event occurrence items. The screen display, once generated, is provided to the display element 56 of the user interface 58 to permit a network system manager or operator to view the event occurrence items considered to be of greatest significance prior to lesser-prioritized event occurrence items. Additionally, through matching operations performed by the matcher, and subsequent normalization by the normalizer 46, the large numbers of event occurrence items are reduced so that insignificant event occurrence items are removed from further consideration. The items remain available, however, in one implementation, at the database 52 if subsequent analysis necessitates additional information.

Figure 2:
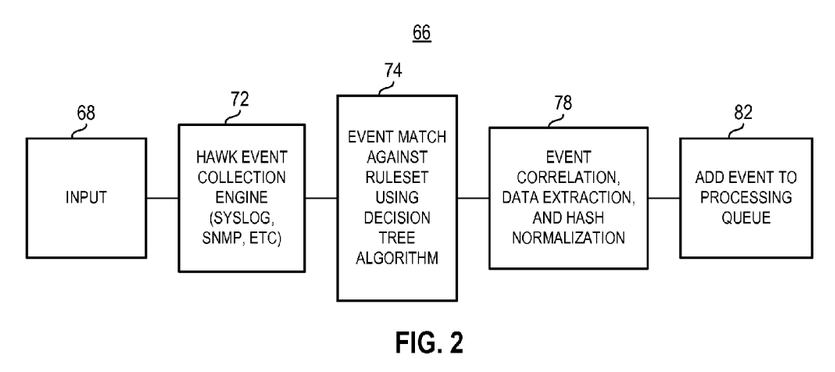
FIG. 2 illustrates a process diagram representative of the process of matching and normalizing performed during operation of an embodiment of the present invention.

Turning next to FIG. 2, a process 66 is shown, representative of operation of a portion of the apparatus 36 shown in FIG. 1. First, and as indicated by the block 68, inputs are generated, either by network-system-entity origination, external origination, or responsive to network-system request. The inputs are related to the occurrence of events that pertain to the network system, i.e., comprise event occurrences. The event occurrences are collected, indicated at the block 72 as event occurrence items by the data collector 38, shown in FIG. 1.

Then, and as indicated by the block 74, the collected data, i.e., the collected event occurrence items are matched through use of a rule set that utilizes a decision tree algorithm. Event occurrence items that match the rules with which the items are compared are further processed, as indicated by the block 78. At the block 78, the event items that have been matched are correlated, relevant parts of the event occurrence items that match the event rule set are correlated, extracted from the associated item, and undergoes hash normalization. Then, and as indicated by the block 82, the normalized event is added to a processing queue.

Figure 3:
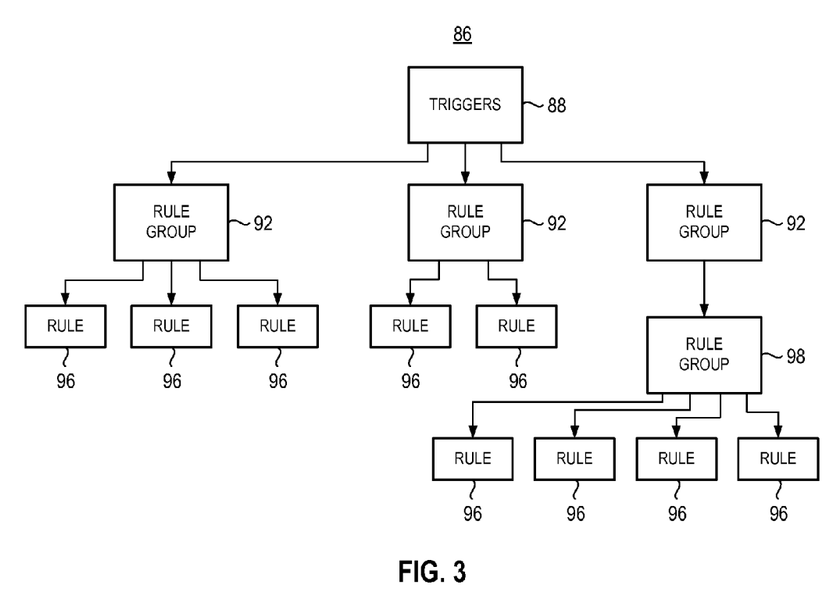
FIG. 3 illustrates an exemplary representation of a nested, management tree used pursuant to matching operations.

FIG. 3 illustrates an exemplary decision tree 86, utilized to match event occurrence items with event rules. The decision tree defines multiple layers and is configured to provide for quick matching of an event item to its related signature. A first layer is referred to as a trigger. The exemplary decision tree 86 includes a single trigger 88. Other decision trees have additional triggers. Determination is made as to whether the trigger matches the event occurrence item. If the event occurrence item matches the trigger, then rule groups, here rule groups 92 are accessed and the event rules 96 are compared with the event occurrence items to determine whether the event occurrence items match with the respective event rules. Nesting within the decision tree is possible, indicated by the sub-rule group 98 of one of the rule groups 92.

Additionally, a module is a container of similar triggers, rule groups, and rules. A module can also contain information regarding the module, including its name, description, devices that the module supports, versioning information, and any other appropriate further documentation related to the module. The nesting of the rule groups facilitates grouping similar rules together. In order for rules to be processed within a rule group, the rule group must match the event occurrence item that is compared against the rule group. And, when a rule group is nested, a match of both the rule group and the sub-rule group is required.

In operation, when an indication of an event occurrence is received, the received indication is processed by a receiving engine, represented in FIG. 1 by the data collector. Examples of receiving engines include the aforementioned SMNP, SYSLOG, and other algorithms. The role of the receiving engine is to convert the received information into a normalized event. The normalized event is represented, e.g., by a hash table, comprising related information of the indication of the event occurrence, including, e.g., network address information, a received time stamp, and the payload of the message of the received indication. The normalized event is provided to an event matching module, represented by the matcher 42 in FIG. 1.

The event matching module is responsible for taking the initial, normalized event and matching the indication of the event against the pre-defined rule set. The is carried out through recursive functionality, providing a tree-like structure, such as the decision tree 86, for data management. The rule set modules include, e.g., compiled modules and a textural rule set. Binary, compiled modules are not defined by behavior and are able to accomplish matching by any available manner or by taking advantage of textual rule sets.

Textual rule sets are separated into three basic classifications that provide for matching. The first class-type is defined as a trigger. A trigger, such as the trigger 88, is a regular expression that must match in order for the rules within the module to continue processing. Additionally, a list of triggers can be specified. Upon matching of a first successful trigger, processing of the associated module continues. A subsequent separating stage comprises the multi-decision tree structure in which any desired number of peer or child nodes for any specified node within the tree structure can be created. Each requires a successful matching before matching against a child node thereof within the decision tree. Rule grouping allows like rules to be grouped together in as many levels as desired, thereby to improve the speed of matching against a lengthy rule list.

A rule contains all of the information required for improved matching, correlation, and scoring. Each rule contains the alert name, a category, a knowledge base identification, host and network packet information, as well as audit procedure information for compliance, monitoring, and scoring. A final rule, upon a successful match, permits assignation of the specific information to a normalized has table to the event occurrence item. And, a final rule allows for multiple matching rules as well as a logical no indication. Once all activities are complete, the event is passed into a processing queue for archiving, scoring, and performance of additional correlation.

Figure 4:
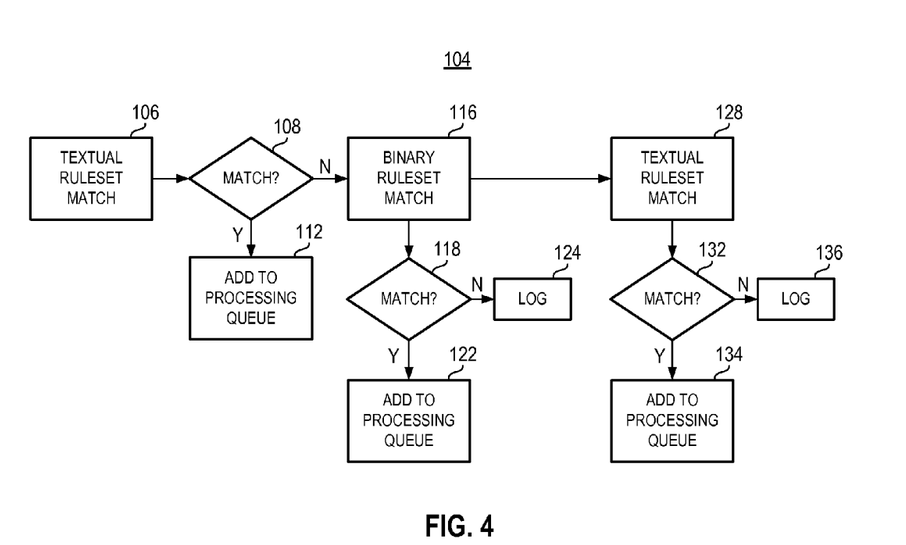
FIG. 4 illustrates another process diagram, also representative of the process of matching performed during operation of an embodiment of the present invention.

FIG. 4 illustrates a process diagram 104. The process 104 is representative of logical decisions made through use of the decision-tree architecture shown in FIG. 3. First and as indicated by the block 106, a textual rule set match is created. Then, a determination is made at the decision block 108 as to whether a match has been made. If yes, the associated event occurrence item is added to a processing queue, indicated by the block 112. If, conversely, a match is not made, the no branch is taken to the block 116, and a binary rule set matching operation is carried out. A determination is made, indicated at the decision block 118, as to whether the event occurrence item matches the rule of the rule set. If so, the event occurrence item is added to the processing queue, indicated at the block 122. If, conversely, a match is not made, the no branch is taken from the decision block 118 to the log block 124.

The process 104 further includes the additional optional operations, indicated at the block 128 of performing a textual rule set match. A determination is made, indicated by the decision block 132, as to whether a match is made. If so, the yes branch is taken to the block 134, and the even occurrence is added to the processing queue. Otherwise the no branch is taken to the log block 136, and the lack of match is logged.

Figure 5:
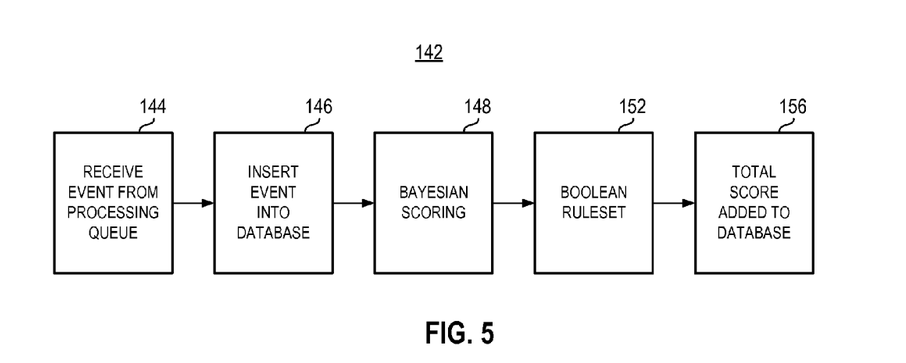
FIG. 5 illustrates a diagram representative of the process of storing performed during operation of an embodiment of the present invention.

FIG. 5 illustrates a process 142 representative of further exemplary operation of an embodiment of the present invention. The process 142 is representative of scoring of event occurrence items that have been matched by a matching operation with an event rule of an event rule set.

First, and as indicated by the block 144, the event is received from a processing queue. Then, and as indicated by the block 146, the event occurrence item is inserted into a database. And, as indicated by the block 148, Bayesian scoring is performed. Then, and as indicated by the block 152, Boolean rules of a score rule set are compared with the event occurrence item. And, as indicated by the block 156, a summed score, i.e., a cumulated or cumulative score, of matches of score rules of a score rule set and the event occurrence item is obtained.

An event occurrence item is received, matched, normalized, and correlated based upon relative information. Then, a score is assigned to the event occurrence item. The score value is determined from a variable length, rule set that determines a successful or unsuccessful match against the unique rules of the rule set. Each rule of the score rule set can have multiple arguments and, in the exemplary implementation, implemented as a Boolean rule, as a positive or negative value. The score, responsive to a successful match of a specific score rule, is summed together with other score-rule results in order to arrive at a final, overall score. The overall score is responsible for relating importance, acting upon thresholds, etc.

An event is any event that might be of interest, such as a user action, a log entry, a security notification, or a performance statistic. A message identifying an event occurrence is originated at any of various devices, including, e.g., an information security device, a network appliance, a computer server, and a computer work station. And, once an event occurrence item is read from a processing and scoring queue, the information related thereto is written to a database, scored against a multitude of scoring mechanisms, and the total score is updated against the newly-processed event.

In the exemplary implementation, before an event is compared against rules of a score rule set, a Naïve Bayesian score is determined. The score is determined by first taking the necessary data chunks out of each required string. The strings are extracted from any of various places including, e.g., the alert name, category type, and payload part of the event occurrence item message.

The Bayesian score is included with existing event properties that are processed by the score rule sets. A rule set is any list of rules that is associated with a positive, or negative, score. When a rule set matches against a provided event, the associated score is added to the existing score. The initial score is zero. Once all of the rules have been compared against an event, a total score is determined and associated within a database to the initial event information, permitting future actions to be taken, based upon a score threshold.

The following are exemplary actions that define score rules that are matched against an event occurrence item. An alert name (regular expressions), an alert category (regular expressions), audit actions, Bayesian score, count (by host/alert), a count (by host/category), a host, either destination or source, an event payload, a port, either destination or source, an alert priority, a resource, and a time stamp are exemplary rules of a score rule set that are utilized in various implementations, define matches that are scored.

When a Bayesian score is utilized, a Bayesian histogram analysis algorithm is utilized to uniquely fingerprint known security and performance issues, while establishing a base line for positive or neutrally-acceptable network traffic, utilizing standard deviation. The algorithm identifies unique attributes within a specified target event. The activity in conjunction with standard deviation facilitates pattern matching. Thereby, both known or trained information is matched and, through use of standard deviation, target events that have not been trained or identified are also matched. An operating baseline is thereby established.

Figure 6:
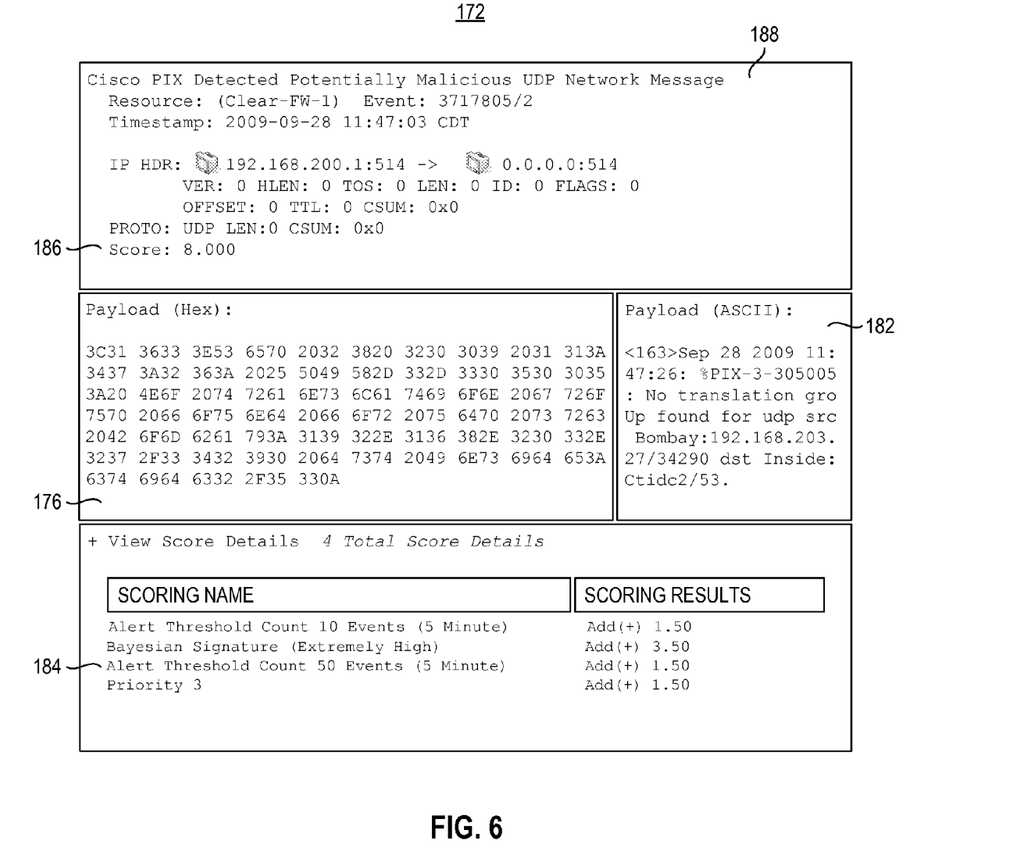
FIG. 6 illustrates an exemplary display generated of an exemplary event including a score associated therewith, generated pursuant to operation of an embodiment of the present invention.

FIG. 6 illustrates an exemplary screen display 172 generated during operation of an embodiment of the present invention. The screen display is related to a single event occurrence item. Here, the raw data comprising the message forming the event occurrence item is displayed in hexadecimal form at the portion 176 and in ASCII form at the portion 182. Scoring results are indicated at the portion 184, a total score is indicated at 186, and other descriptive information is displayed in the portion 188. The display 172 is displayed at a display screen of the user interface, which provides a role-based access control for administration over secure encrypted sessions.

Thereby, a manner is provided by which to facilitate analysis of events that are related to a network system. Event occurrence items that are considered to be potentially significant are scored, and the score is used to prioritize the sequence order of potentially significant event occurrence items that are analyzed by a network system manager or operator.

The previous descriptions are of preferred examples for implementing the invention, and the scope of the invention should not necessarily be limited by this description. The scope of the present invention is defined by the following claims.

What is claimed is:

1. An apparatus for facilitating analysis of system events, said apparatus comprising:
 a collected-event matcher configured to identify collected system-event items related to network or information security occurring in a computer network that match at least an event rule of an event-rule set; and
 a scorer configured to score each system-event item identified by said collected-event matcher with one or more scores using at least a scoring rule of a scoring-rule set, wherein the one or more scores are summed to determine a cumulative score of each scored system-event item that is used to prioritize the system-event items.

2. The apparatus of claim 1 further comprising a data collector configured to collect the system-event items.

3. The apparatus of claim 1 further comprising a normalizer configured to normalize collected system-event items that match the at least the event rule of the event-rule set.

4. The apparatus of claim 3 wherein said scorer is configured to score each system-event item identified by said collected-event matcher, once normalized by said normalizer.

5. The apparatus of claim 1 further including a prioritizer configured to prioritize the system-event items sequentially according to the score associated with each scored system-event item.

6. The apparatus of claim 1 wherein the at least one scoring rule of the scoring-rule set comprises a Bayesian score generated pursuant to pattern matching.

7. The apparatus of claim 1 wherein the event-rule set comprise a set of end rules of a rule group of a plurality of rule groups.

8. The apparatus of claim 7 wherein said collected-event matcher is further configured to select the rule group of the plurality of rule groups that contain the set of end rules comprising the event-rule set.

9. The apparatus of claim 1 wherein the event-rule set comprises a nested set of end rules.

10. The apparatus of claim 1 wherein the event-rule set comprises a trigger and nested set of end rules.

11. A method for facilitating analysis of system events, said method comprising:
 identifying collected system-event items related to network or information security occurring in a computer network that match at least an event rule of an event-rule set; and
 scoring each system-event item identified during said identifying with one or more scores using at least a scoring rule of a scoring-rule set, wherein the one or more scores are summed to determine a cumulative score of each scored system-event item that is used to prioritize the scored system-event items.

12. The method of claim 11 further comprising collecting the system-event items.

13. The method of claim 11 further comprising normalizing collected system-event items that match the at least the event rule of the event-rule set.

14. The method of claim 11 further comprising prioritizing the scored system-events.

15. The method of claim 14 further comprising displaying indications of the scored system events system-event items, once prioritized during said prioritizing.

16. The method of claim 11 wherein further comprising comparing each system-event item identified during said matching with each scoring rule of the scoring rule set.

17. The method of claim 11 wherein said identifying comprises selecting a rule group of a plurality of rule groups that contain a set of end rules comprising the end-rule set.

18. A method for facilitating analysis of a medical center computer network, said method comprising:
 identifying collected computer system event items related to network or information security occurring in the computer network that match at least one computer system event rule of a computer system event rule set; and
 scoring each computer system event item identified during said identifying using at least one scoring rule of a scoring rule set, including summing one or more scores respectively based on each at least one scoring rule to determine a total score of each computer system event;
 prioritizing the computer system events using the total score; and
 analyzing a prioritized list of scored system event items.

19. The apparatus of claim 1, wherein the system-event items are generated by at least one of an information security device and a firewall.

20. The method of claim 11, wherein the system-event items are generated by at least one of an information security device and a firewall.

* * * * *

UNITED STATES PATENT AND TRADEMARK OFFICE
CERTIFICATE OF CORRECTION

PATENT NO. : 8,560,481 B2
APPLICATION NO. : 12/947626
DATED : October 15, 2013
INVENTOR(S) : Naifeh et al.

Page 1 of 1

It is certified that error appears in the above-identified patent and that said Letters Patent is hereby corrected as shown below:

In the Claims:

In claim 18, line 1 (at column 10, line 35), delete the words "medical center".

Signed and Sealed this
Thirty-first Day of December, 2013

Margaret A. Focarino
*Commissioner for Patents of the United States Patent and Trademark Office*